United States Patent
Shiao et al.

(10) Patent No.: US 11,635,114 B2
(45) Date of Patent: Apr. 25, 2023

(54) CONTROLLABLE ROTARY BRAKE

(71) Applicant: National Taipei University of Technology, Taipei (TW)

(72) Inventors: Yaojung Shiao, Taipei (TW); Mahendra Babu Kantipudi, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 17/521,873

(22) Filed: Nov. 9, 2021

(65) Prior Publication Data
US 2022/0163078 A1   May 26, 2022

(30) Foreign Application Priority Data
Nov. 26, 2020   (TW) ................................ 109141610

(51) Int. Cl.
*F16F 9/53* (2006.01)
*F16D 57/00* (2006.01)

(52) U.S. Cl.
CPC ............ *F16D 57/002* (2013.01); *F16F 9/535* (2013.01)

(58) Field of Classification Search
CPC ............... F16D 57/002; F16D 2121/20; F16D 2129/08; F16F 9/535
(Continued)

(56) References Cited

U.S. PATENT DOCUMENTS 4,172,242 A * 10/1979 Myers .................... H01F 7/06
188/138
4,896,754 A * 1/1990 Carlson ............... H02K 49/104
464/29
(Continued)

FOREIGN PATENT DOCUMENTS

CN   100504100   6/2009
CN   104776132   1/2017
(Continued)

OTHER PUBLICATIONS

Mahendra Babu Kantipudi, "Investigation and Development of Advanced Magneto-Rheological Fluid Based Devices for Engineering Applications", Ph.D. Thesis of College of Mechanical & Electrical Engineering, National Taipei University of Technology, Aug. 2020, Grace Period Disclosure, pp. 1-141.
(Continued)

*Primary Examiner* — Thomas J Williams
(74) *Attorney, Agent, or Firm* — JCIPRNET

(57) ABSTRACT

A controllable rotary brake includes two non-magnetically permeable isolating rings, a shaft, an even number of magnetic field generating portions, at least one resistance disc, and at least one magneto-rheological fluid layer. The non-magnetically permeable isolating rings are spaced apart from each other in an axial direction, and each has a bottom wall. An even number of penetrating holes are formed on the bottom wall. The shaft is rotatably inserted in and adapted to pivot relative to the non-magnetically permeable isolating rings. Two ends of each magnetic field generating portion are tightly fitted to the corresponding penetrating holes. The resistance disc is sleeved on the shaft and is spaced apart from one of the non-magnetically permeable isolating rings. The magneto-rheological fluid layer fills between the resistance disc and one of the non-magnetically permeable
(Continued)

isolating rings and contacts the resistance disc and one end of each magnetic field generating portion.

13 Claims, 11 Drawing Sheets

(58) Field of Classification Search
USPC .......................................... 188/267.1, 267.2
See application file for complete search history.

(56) References Cited

U.S. PATENT DOCUMENTS

| | | | | |
|---|---|---|---|---|
| 4,942,947 | A * | 7/1990 | Shtarkman | F16F 9/145 188/290 |
| 5,167,850 | A * | 12/1992 | Shtarkman | H01F 1/44 252/78.3 |
| 5,257,681 | A * | 11/1993 | Shtarkman | B60G 13/06 188/290 |
| 5,354,488 | A * | 10/1994 | Shtarkman | H01F 1/447 252/75 |
| 5,573,088 | A * | 11/1996 | Daniels | F16F 9/10 188/267 |
| 7,225,905 | B2 | 6/2007 | Namuduri et al. | |
| 8,397,885 | B2 * | 3/2013 | Shiao | F16F 9/535 188/164 |
| 2022/0163078 | A1 * | 5/2022 | Shiao | F16D 57/002 |

FOREIGN PATENT DOCUMENTS

| | | | | |
|---|---|---|---|---|
| CN | 106838062 | A * | 6/2017 | ........... F16D 57/002 |
| CN | 107575524 | | 1/2018 | |
| CN | 108897422 | A * | 11/2018 | .............. G06F 3/011 |
| CN | 112727951 | A * | 4/2021 | ............ B60T 8/1761 |
| JP | 2020153471 | | 9/2020 | |
| TW | 201235581 | | 9/2012 | |
| TW | 201533342 | | 9/2015 | |
| TW | 201805544 | | 2/2018 | |
| TW | M577747 | | 5/2019 | |

OTHER PUBLICATIONS

"Office Action of Taiwan Counterpart Application", dated Oct. 25, 2022, p. 1-p. 10.

* cited by examiner

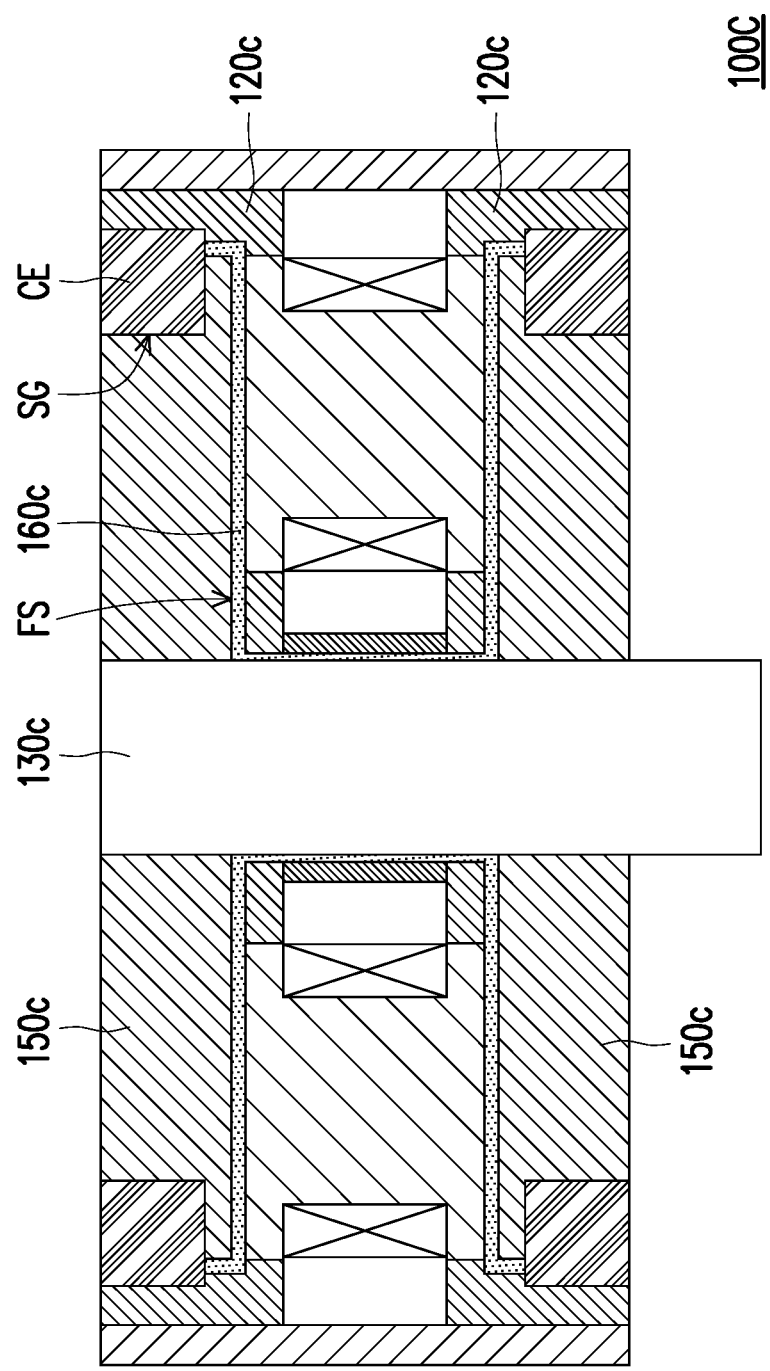

CONTROLLABLE ROTARY BRAKE

CROSS-REFERENCE TO RELATED APPLICATION

This application claims the priority benefit of Taiwan application Ser. No. 109141610, filed on Nov. 26, 2020. The entirety of the above-mentioned patent application is hereby incorporated by reference herein and made a part of this specification.

BACKGROUND

Technical Field

The disclosure relates to a brake, and in particularly, to a controllable rotary brake adopting magnetic rheological fluid.

Description of Related Art

Magnetic rheological fluid (MRF) is a suspension liquid formed by micron-sized magnetic particles, carrier fluid (e.g., mineral oil), and surfactants. The magnetic rheological fluid may activate the magnetic particles in the carrier fluid under the action of an external magnetic field to change the arrangement of the magnetic particles in the carrier liquid. Such that the viscosity of the magnetic rheological fluid may be adjusted. For instance, when the external magnetic field changes from weak to strong, the magnetic rheological fluid may change from low viscosity to high viscosity in a short time. Besides, the magnetic rheological fluid is reversible and controllable. That is, the magnetic rheological fluid may increase the viscosity to form a solid state or reduce the viscosity to form a liquid state as the magnetic field changes.

An existing magneto-rheological fluid brake includes a stator, a rotor, and the magnetic rheological fluid. The magnetic rheological fluid generally fills between the stator and the rotor. The viscosity of the magnetic rheological fluid may be adjusted through the externally-applied magnetic field. The contact area between the rotor and the magnetic rheological fluid is one of the main factors affecting the performance of the brake. At present, in an existing magneto-rheological fluid brake, the outer ring surface or both end surfaces of the rotor are treated as the working surface to be in contact with the magnetic rheological fluid. Most of the magneto-rheological fluid brakes adopt a single magnetic pole. The disadvantage of using a single magnetic pole is that the acting area of the magnetic field on the magnetic rheological fluid is limited (limited by the characteristic of the magnetic field propagating in the shortest path). The generated torque (resistance acted on the rotor) is thereby reduced, such that an insufficient torque to volume ratio is provided by an existing magneto-rheological fluid brake, and application ranges are therefore limited.

SUMMARY

The disclosure provides a controllable rotary brake providing an increased torque to volume ratio and expanded application ranges.

A controllable rotary brake provided by the disclosure includes two non-magnetically permeable isolating rings, a shaft, an even number of magnetic field generating portions, at least one resistance disc, and at least one magneto-rheological fluid layer. The two non-magnetically permeable isolating rings are spaced apart from each other in an axial direction. Each of the non-magnetically permeable isolating rings has a bottom wall, and an even number of penetrating holes are formed on the bottom wall. The shaft is rotatably inserted in the two non-magnetically permeable isolating rings and is adapted to pivot relative to the two non-magnetically permeable isolating rings in the axial direction. Two ends of each of the magnetic field generating portions are tightly fitted to the corresponding penetrating holes of the two non-magnetically permeable isolating rings. The at least one resistance disc is sleeved on the shaft and is spaced apart from one of the non-magnetically permeable isolating rings. The at least one magneto-rheological fluid layer fills between the at least one resistance disc and one of the non-magnetically permeable isolating rings. The at least one magneto-rheological fluid layer contacts the at least one resistance disc and one end of each of the magnetic field generating portions.

To sum up, the controllable rotary brake provided by the disclosure has an even number of magnetic field generating portions, and opposite magnetic field propagation paths are provided between adjacent magnetic field generating portions. After passing through the at least one magneto-rheological fluid layer, the magnetic fields of the magnetic field generating portions may be propagated to other adjacent magnetic field generating portions along the at least one resistance disc. When being propagated along the magnetic field generating portions and the at least one resistance disc, the magnetic fields may act on different positions of the at least one magneto-rheological fluid layer, so that acting areas of the at least one magneto-rheological fluid layer may be expanded, and a controllable maximum value of torque may be increased. Therefore, compared to an existing unipolar magneto-rheological fluid brake, the controllable rotary brake provided by the disclosure provides a favorable torque to volume ratio and expanded application ranges.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5A is a cross-sectional schematic view of a controllable rotary brake adopting two resistance discs according to another embodiment of the disclosure.

DESCRIPTION OF THE EMBODIMENTS

Figure 1A:
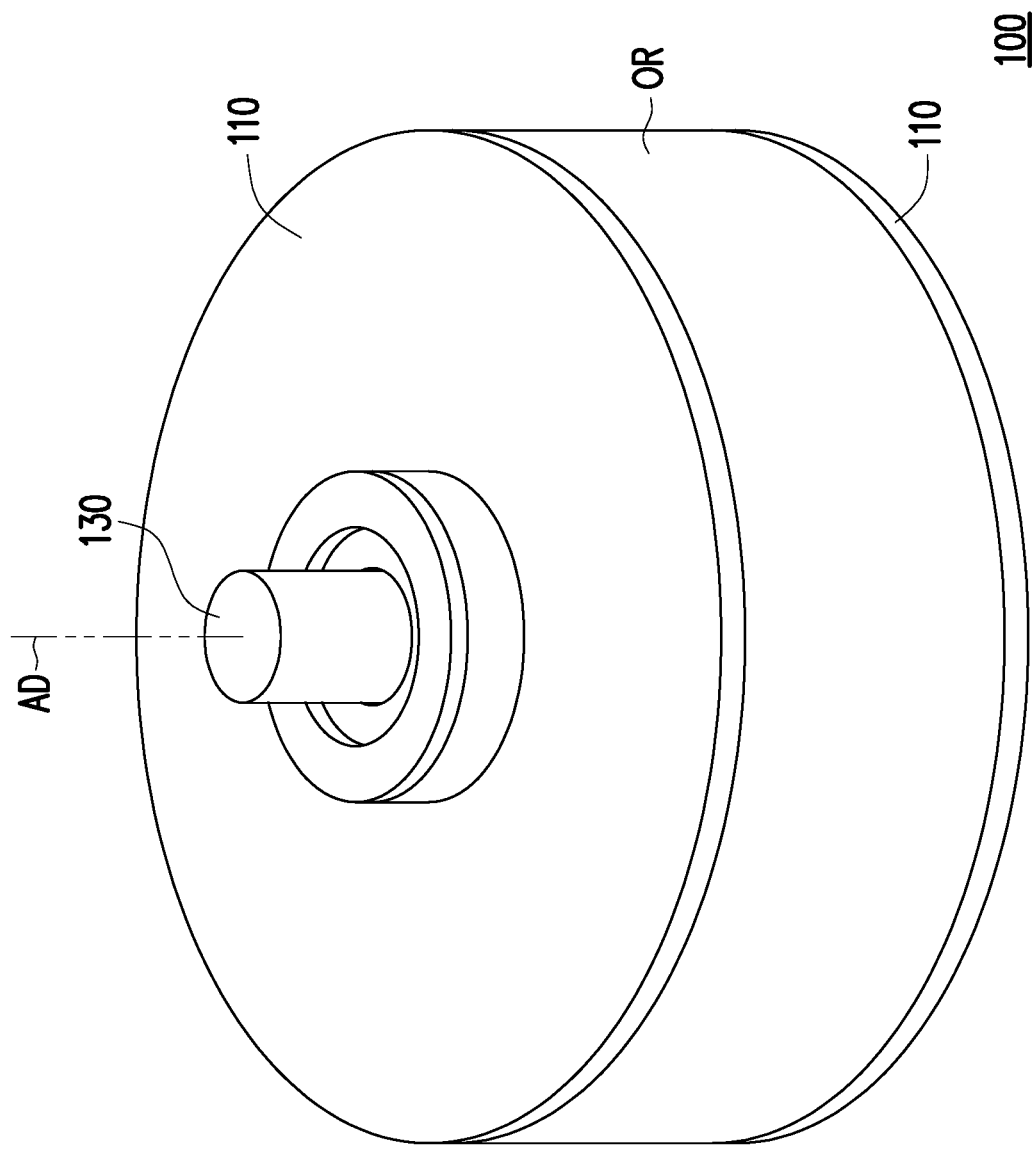
FIG. 1A is a three-dimensional schematic view of a controllable rotary brake according to an embodiment of the disclosure.
Figure 1B:
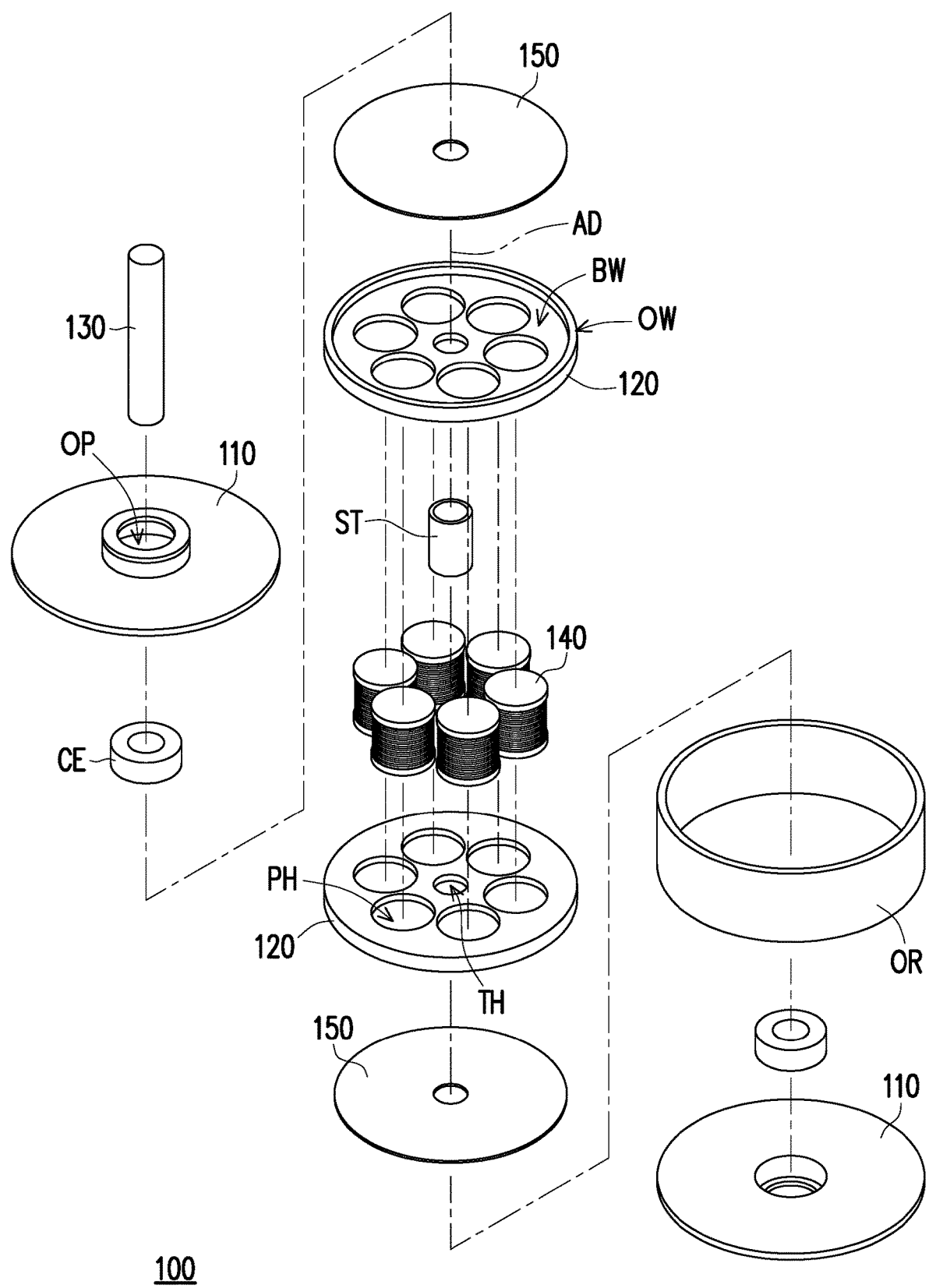
FIG. 1B is an explosive schematic view of devices of the controllable rotary brake of FIG. 1A.
Figure 1C:
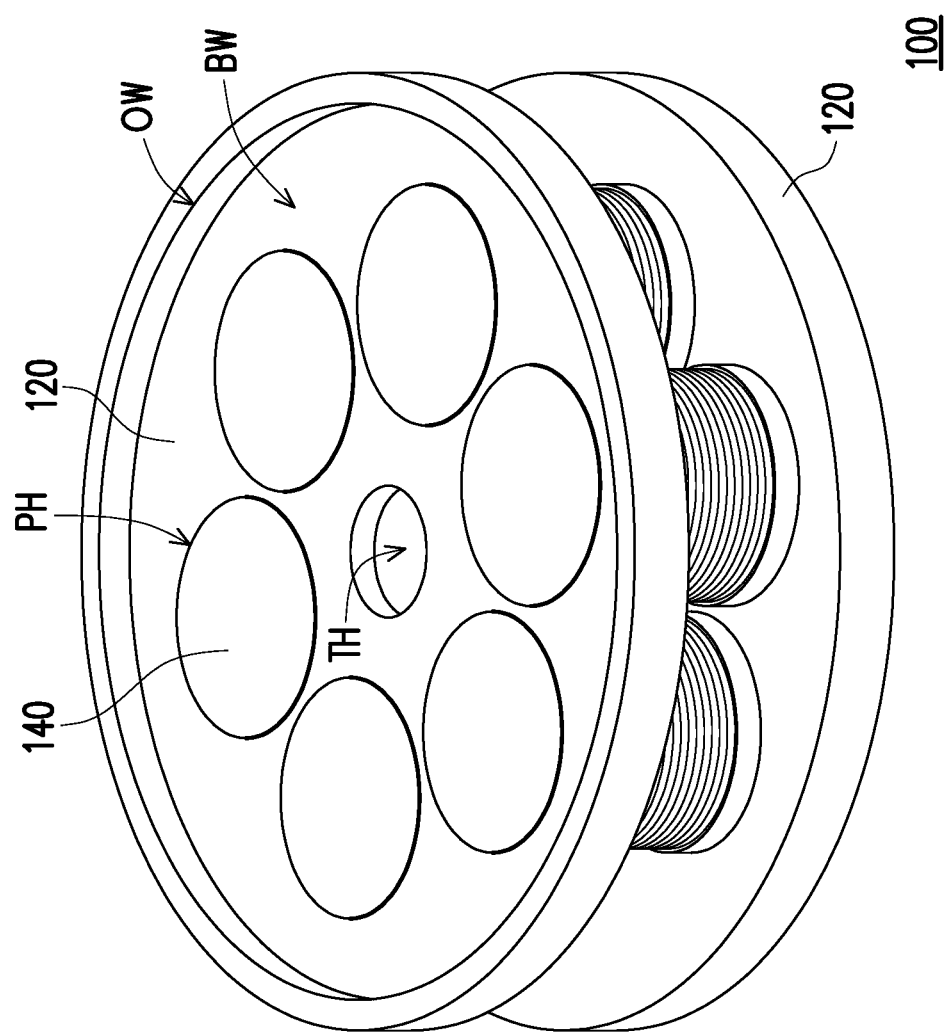
FIG. 1C is a schematic view of assembly of part of the devices of the controllable rotary brake of FIG. 1A.
Figure 1D:
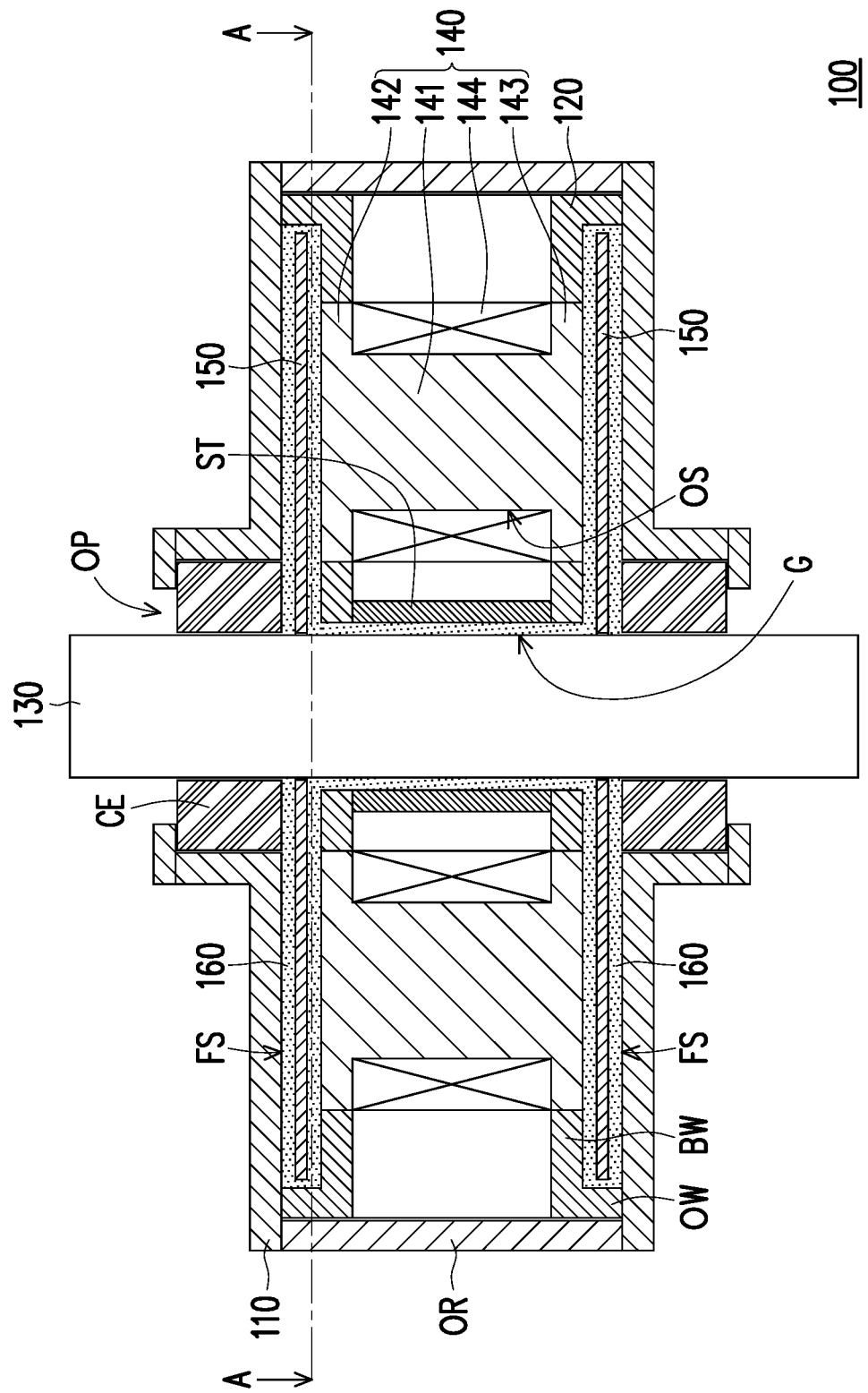
FIG. 1D is a cross-sectional schematic view of the controllable rotary brake of FIG. 1A.

FIG. 1A is a three-dimensional schematic view of a controllable rotary brake according to an embodiment of the disclosure. FIG. 1B is an explosive schematic view of devices of the controllable rotary brake of FIG. 1A. FIG. 1C is a schematic view of assembly of part of the devices of the controllable rotary brake of FIG. 1A. FIG. 1D is a cross-sectional schematic view of the controllable rotary brake of FIG. 1A.

With reference to FIG. 1A to FIG. 1C, a controllable rotary brake 100 provided by the disclosure includes two outer casings 110, two non-magnetically permeable isolating rings 120, a shaft 130, an even number of magnetic field generating portions 140, at least one resistance disc 150 (two resistance discs 150 are schematically shown), and at least one magneto-rheological fluid layer 160 (two magneto-rheological fluid layers 160 are schematically shown).

The two outer casings 110 are made of a magnetic material including iron, cobalt, nickel, and an alloy thereof, which means that the outer casings 110 may generate magnetization under the action of an external magnetic field and exhibit the characteristic of magnetic permeability. The two non-magnetically permeable isolating rings 120 are disposed inside the outer casings 110 and are spaced apart from each other in an axial direction AD. The non-magnetically permeable isolating rings 120 are made of a non-magnetic material and are configured to block magnetic field propagation. To be specific, each of the non-magnetically permeable isolating rings 120 has a bottom wall BW, an even number of penetrating holes PH, and a through hole TH. The even number of penetrating holes PH are formed on the bottom wall BW, the through hole TH is formed on a center of the bottom wall BW, and the even number of penetrating holes PH surround the through hole TH.

The shaft 130 is rotatably inserted in the two non-magnetically permeable isolating rings 120 and the outer casings 110. Two ends of the shaft 130 protrude up and down outside the outer casings 110 in the axial direction AD. Herein, the shaft 130 is adapted to pivot relative to the two non-magnetically permeable isolating rings 120 in the axial direction AD. In other embodiments, only one end of the shaft 130 protrudes outside the outer casing 110, which should however not be construed as limitations to the disclosure.

With reference to FIG. 1C and FIG. 1D, the even number of magnetic field generating portions 140 are arranged between the two non-magnetically permeable isolating rings 120. Two ends of each of the magnetic field generating portions 140 are tightly fitted to the corresponding penetrating holes PH of the two non-magnetically permeable isolating rings 120. The two resistance discs 150 are sleeved on the shaft 130, and each of the resistance discs 150 is located between one outer casing 110 and the corresponding non-magnetically permeable isolating ring 120. In other embodiments, the even number of magnetic field generating portions 140 are, for example, arranged between the two non-magnetically permeable isolating rings 120 in an equiangular manner, which should however not be construed as limitations to the disclosure.

The two magneto-rheological fluid layers 160 fill between the outer casings 110 and the two non-magnetically permeable isolating rings 120. Each of the magneto-rheological fluid layers 160 contacts the corresponding resistance disc 150 and one end of each of the magnetic field generating portions 140. Additionally, the magneto-rheological fluid layers 160 are formed by magnetic particles, carrier fluid, an organic bentonite thixotropic agent, a surfactant, and solid lubricant and exhibit good lubrication and friction reduction effects.

With reference to FIG. 1B to FIG. 1D, an outer ring member OR is also included and is sleeved on outer peripheries of the two non-magnetically permeable isolating rings 120, and the outer ring member OR is made of a non-magnetic material. The two outer casings 110 are disposed on an upper side and a lower side of the outer ring member OR and form two flowing spaces FS together with the two non-magnetically permeable isolating rings 120. To be specific, each of the non-magnetically permeable isolating rings 120 has a ring side wall OW. Each of the ring side walls OW protrudes from and forms on an outer edge of each of the bottom walls BW and is propped against each of the outer casings 110 to form each of the flowing spaces FS, and each of the ring side walls OW surrounds each of the resistance discs 150. The two magneto-rheological fluid layers 160 fill in the corresponding flowing spaces FS, and the two resistance discs 150 are located in the two flowing spaces FS.

Additionally, the two magneto-rheological fluid layers 160 are distributed in the two flowing spaces FS formed by the two non-magnetically permeable isolating rings 120 and the two outer casings 110 and encapsulate the two resistance discs 150. The shaft 130 and the two resistance discs 150 form a rotor together, and the outer casings 110, the two non-magnetically permeable isolating rings 120, and the even number of magnetic field generating portions 140 form a stator. When the rotor pivots relative to the stator in the axial direction AD, the two resistance discs 150 generate and applies shear stress on the two magneto-rheological fluid layers 160, meaning that when shear stress resistance of the magneto-rheological fluid layers 160 increases, viscosity thereof increases, otherwise, the viscosity decreases. When the viscosity increases, in the case that resistance that each of the resistance discs 150 is required to overcome when turning relative to each of the magneto-rheological fluid layers 160 increases, torque of the controllable rotary brake 100 increases, otherwise, the torque decreases.

In this embodiment, two surfaces of each of the resistance discs 150 contact each of the magneto-rheological fluid layers 160, and in this way, the resistance applied by the magneto-rheological fluid layers 160 on the resistance discs 150 increases. In other embodiments, only one surface of each of the resistance discs contacts each of the magneto-rheological fluid layers, and the other surface contacts air, which may be determined according to torque control needs.

With reference to FIG. 1C and FIG. 1D, each of the magnetic field generating portions 140 has a magnetically permeable pillar 141, a first magnetic pole 142, a second magnetic pole 143, and a magnetically permeable coil 144.

The first magnetic pole 142 and the second magnetic pole 143 are disposed on two ends of the magnetically permeable pillar 141 and are tightly fitted to the two corresponding penetrating holes PH of the two non-magnetically permeable isolating rings 120. The first magnetic pole 142 and the second magnetic pole 143 protrudes outside the magnetically permeable pillar 141 in a radial direction. The magnetically permeable coil 144 surrounds around an outer ring surface OS of the magnetically permeable pillar 141 and is located between the first magnetic pole 142 and the second magnetic pole 143. The magnetically permeable coil 144 and the magnetically permeable pillar 141 may generate a magnetic field exhibiting corresponding strength according to magnitude of an input current. Herein, the first magnetic pole 142 is an N pole and the second magnetic pole 143 is an S pole. The magnetic field travels from the N pole and returns to the S pole to form a closed magnetic line of force.

Figure 2A:
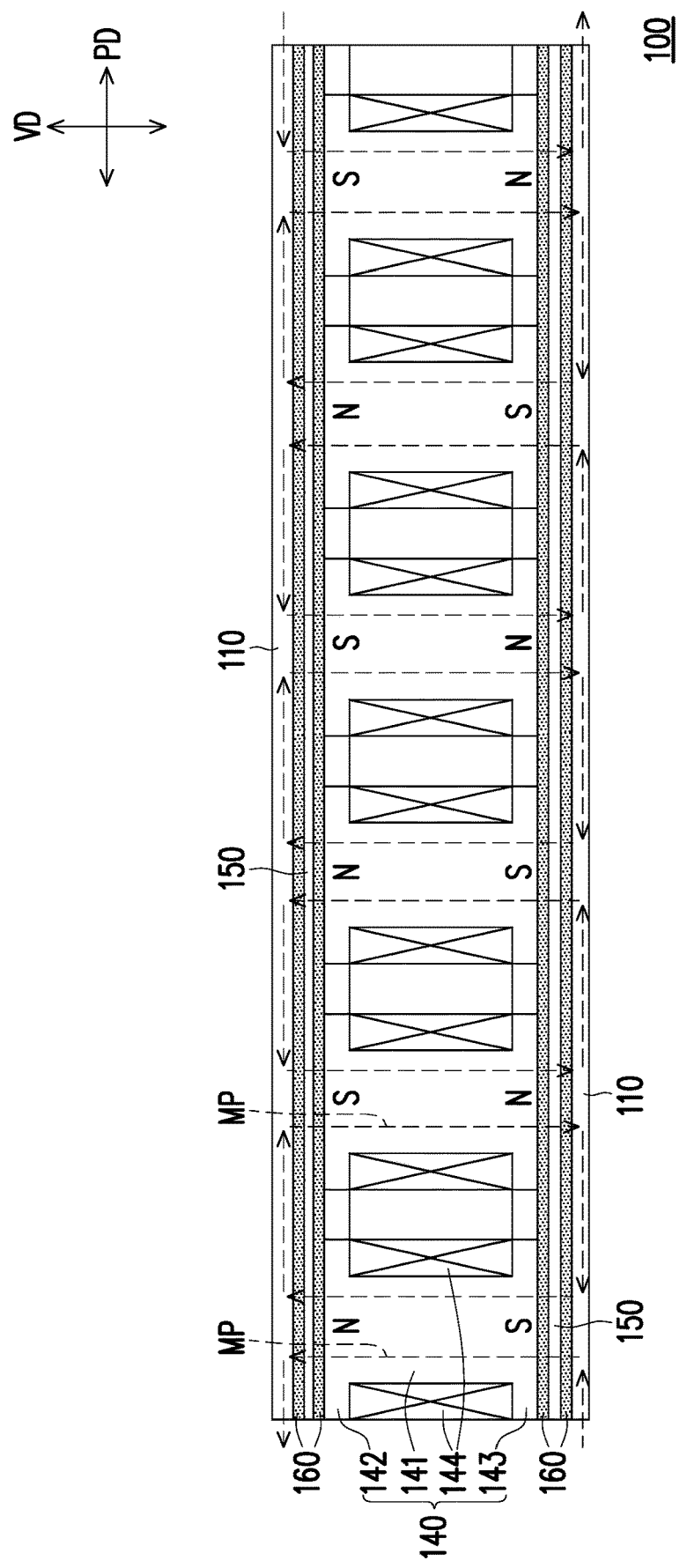
FIG. 2A is a side schematic view of a plane net of a magnetic field propagation direction of the controllable rotary brake of FIG. 1D.
Figure 2B:
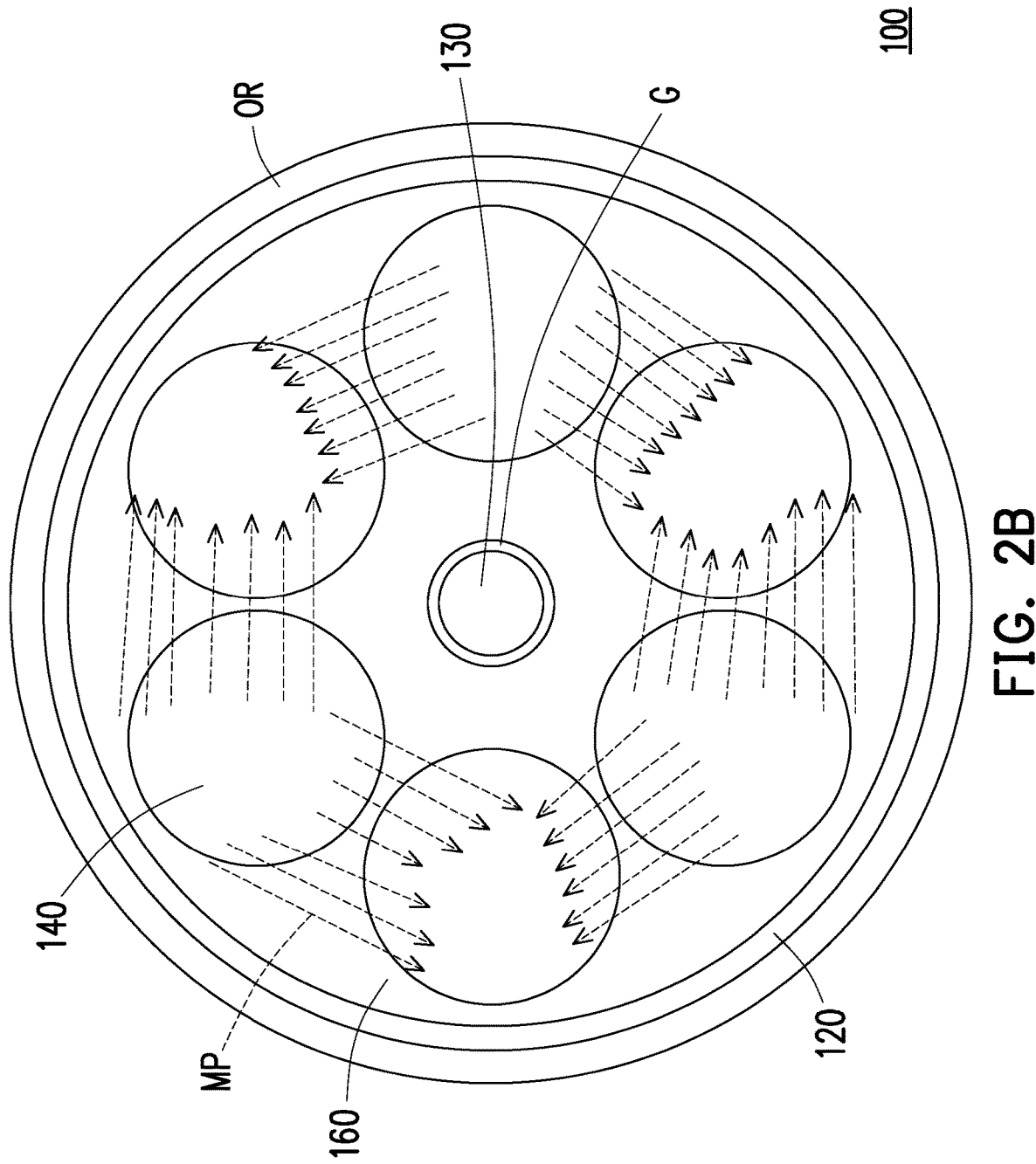
FIG. 2B is a schematic view of a top-view plane and the magnetic field propagation direction of the controllable rotary brake of FIG. 1D taken along a line segment A-A.

FIG. 2A is a side schematic view of a plane net of a magnetic field propagation direction of the controllable rotary brake of FIG. 1D. FIG. 2B is a schematic view of a top-view plane and the magnetic field propagation direction of the controllable rotary brake of FIG. 1D taken along a line segment A-A.

With reference to FIG. 2A and FIG. 2B, a magnetic field propagation path MP of each of the magnetic field generating portions 140 provided by this embodiment is opposite to two magnetic field propagation paths of adjacent two magnetic field generating portions 140. For instance, when the first magnetic pole 142 (N pole) of one magnetic field generating portion 140 faces up and the second magnetic pole 143 (S pole) faces down, the first magnetic poles 142 (N pole) of two magnetic field generating portions 140 adjacent to the magnetic field generating portion 140 face down and the second magnetic poles 143 (S pole) face up. As the magnetic field propagation paths MP of the magnetic field generating portions 140 are disposed in an alternating manner, areas of magnetic fields acted on the two magneto-rheological fluid layers 160 applied by the magnetic field generating portions 140 may increase, such that the controllable rotary brake 100 may generate considerable torque.

With reference to FIG. 2A and FIG. 2B, the magnetic field propagation paths MP of the magnetic field generating portions 140 inside the outer casings 110 are described in detail as follows. The magnetic field propagation path MP of each of the magnetic field generating portions 140 is transmitted from the first magnetic pole 142 in a vertical direction VD. The vertically-transmitted magnetic field may pass through a portion of the magneto-rheological fluid layer 160 corresponding to magnitude of the first magnetic pole 142 and activate magnetic particles thereof and is transmitted to and magnetizes one of the outer casings 110 after passing through the magneto-rheological fluid layer 160.

The magnetic field is transmitted to two second magnetic poles 143 of two adjacent magnetic field generating portions 140 in a horizontal direction PD of one of the outer casings 110. The horizontally-transmitted magnetic field passes through another portion of the magneto-rheological fluid layer 160 located at the two adjacent magnetic field generating portions 140 and activates the magnetic particles thereof. Next, the magnetic field is transmitted to the other outer casing 110 along the corresponding two magnetically permeable pillars 141 and the two first magnetic poles 142 and is finally transmitted back to the second magnetic pole 143 of each of the magnetic field generating portions 140 along the other outer casing 110.

In short, after being transmitted from the first magnetic pole 142 in the vertical direction VD, the magnetic field of each of the magnetic field generating portions 140 is transmitted in the horizontal direction PD of the corresponding outer casing 110. In this way, the area of the magnetic field acted on the magneto-rheological fluid layer 160 may increase (with reference to FIG. 2B, another portion of the magneto-rheological fluid layer 160 located outside the first magnetic pole 142 and the second magnetic pole 143 may be activated).

With reference to FIG. 1B and FIG. 1C, a sleeving tube ST and two ring-shaped members CE are further included. Two ends of the sleeving tube ST are propped against the two non-magnetically permeable isolating rings 120 and communicate with the two through holes TH. A gap G is provided between the sleeving tube ST and the shaft 130, and the two magneto-rheological fluid layers 160 fill the gap G to contact a middle portion of the shaft 130. The shaft 130 is inserted in the sleeving tube ST and is adapted to pivot relative to the sleeving tube ST. The sleeving tube ST and the magneto-rheological fluid layers 160 are configured to prevent a portion of a surface of the shaft 130 located between the two non-magnetically permeable isolating rings 120 from being suspended in the outer casings 110, such that rotation stability of the shaft 130 may be accordingly improved. The two ring-shaped members CE are tightly fitted to two opposite openings OP of the two outer casings 110, and the shaft 130 is inserted in the two ring-shaped members CE and are adapted to pivot relative to the two ring-shaped members CE. The two ring-shaped members CE are tightly fitted to the two outer casings 110, such that the magneto-rheological fluid layers 160 are prevented from leaking out.

Figure 1E:
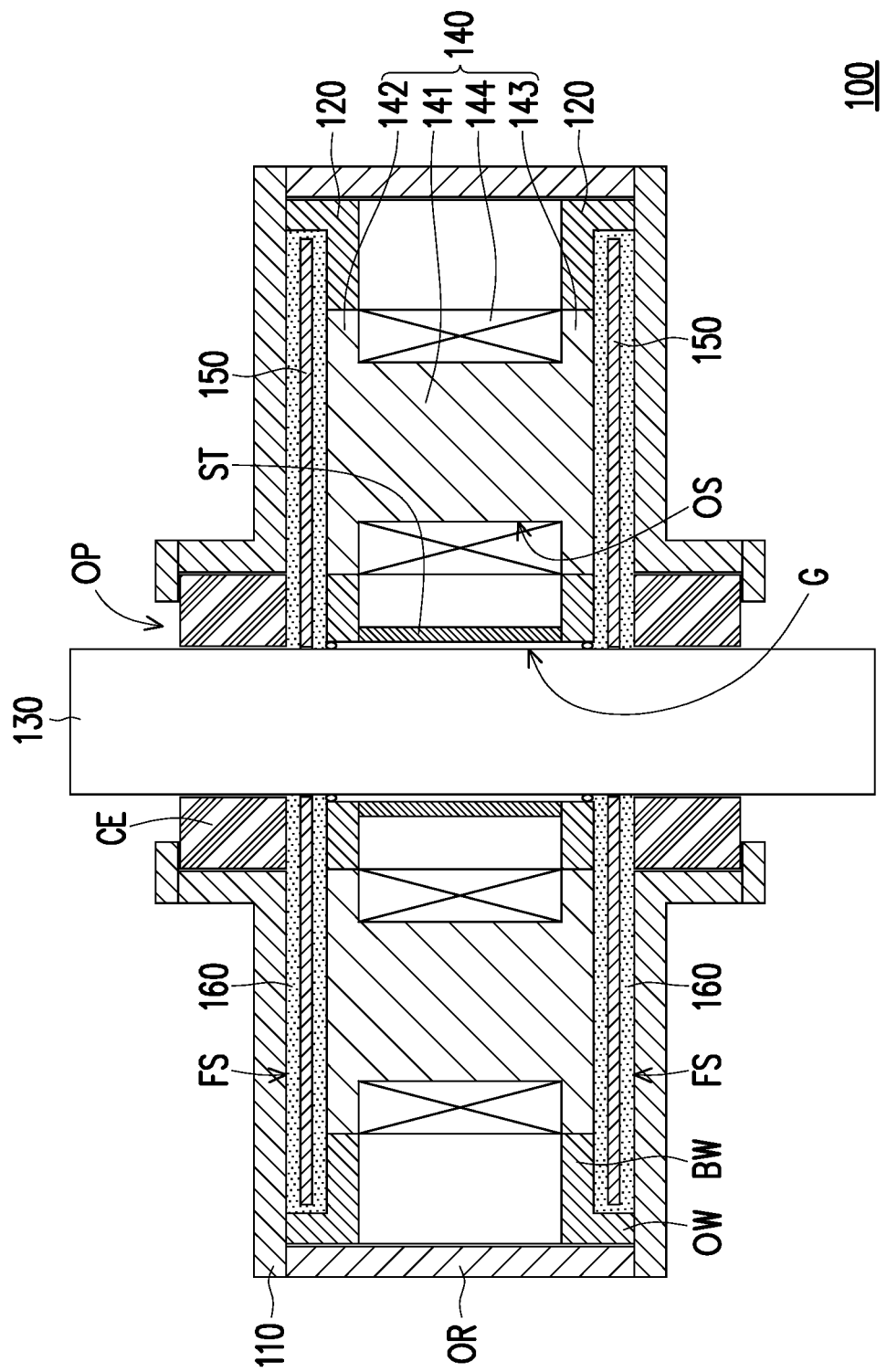
FIG. 1E is a cross-sectional schematic view of a shaft and a sleeving tube of the controllable rotary brake according to another embodiment.

FIG. 1E is a cross-sectional schematic view of a shaft and a sleeving tube of the controllable rotary brake according to another embodiment. With reference to FIG. 1E, two ends of the sleeving tube ST are engaged with the two through holes TH of the two non-magnetically permeable isolating rings 120, and a plurality of O-rings are sleeved on the shaft 130 to prevent leakage of the magneto-rheological fluid layers 160, such that the gap G is provided between the sleeving tube ST and the shaft 130, and that the two magneto-rheological fluid layers 160 located in the two non-magnetically permeable isolating rings 120 are separated.

Figure 3:
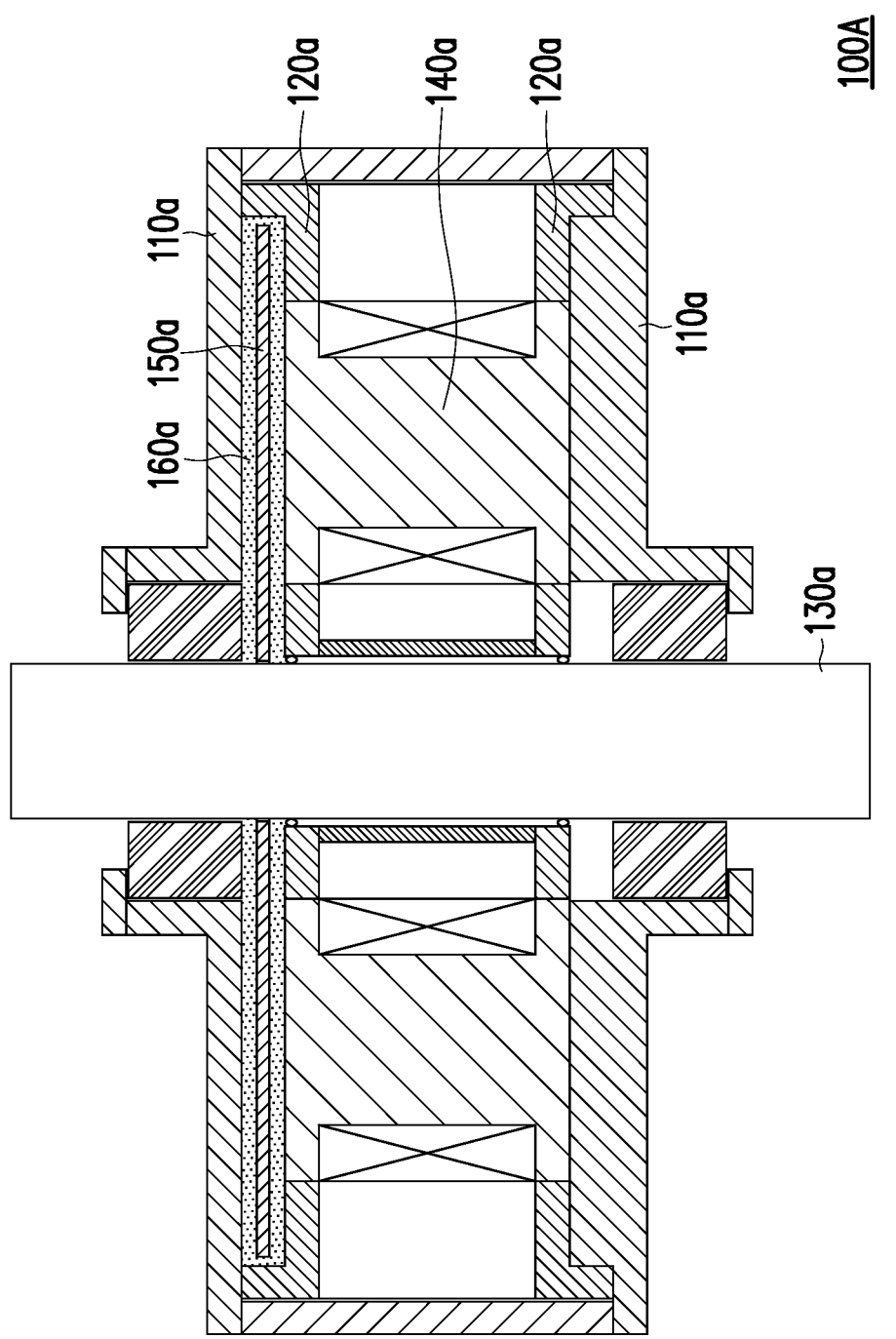
FIG. 3 is a cross-sectional schematic view of a controllable rotary brake adopting a single resistance disc according to another embodiment of the disclosure.

FIG. 3 is a cross-sectional schematic view of a controllable rotary brake adopting a single resistance disc according to another embodiment of the disclosure.

With reference to FIG. 3, a controllable rotary brake 100A provided by this embodiment is similar to the controllable rotary brake 100 provided in FIG. 1D. A difference therebetween is that the controllable rotary brake 100A has a resistance disc 150a and a magneto-rheological fluid layer 160a. The resistance disc 150a is sleeved on a shaft 130a and is located between one of outer casings 110a and a corresponding non-magnetically permeable isolating ring 120a. The magneto-rheological fluid layer 160a fills between one outer casing 110a of the outer casings 110a and the corresponding non-magnetically permeable isolating ring 120a, and the magneto-rheological fluid layer 160a contacts the resistance disc 150a and one end of each of magnetic field generating portions 140a. The other corresponding outer casing 110a is in surface contact with the other non-magnetically permeable isolating ring 120a and the magnetic field generating portions 140a. In this embodiment, magnetic fields of the magnetic field generating portions 140a are transmitted to one of the outer casings 110a through the magneto-rheological fluid layer 160, for example, and the magnetic fields of the magnetic field generating portions 140a may also be transmitted to the other outer casing 110a through surface contact.

A resistance control manner of the controllable rotary brake 100A is identical to that of the controllable rotary brake 100, and description thereof is thus not repeated. In short, maximum resistance of the controllable rotary brake 100A may be half of the maximum resistance of the controllable rotary brake 100.

Figure 4:
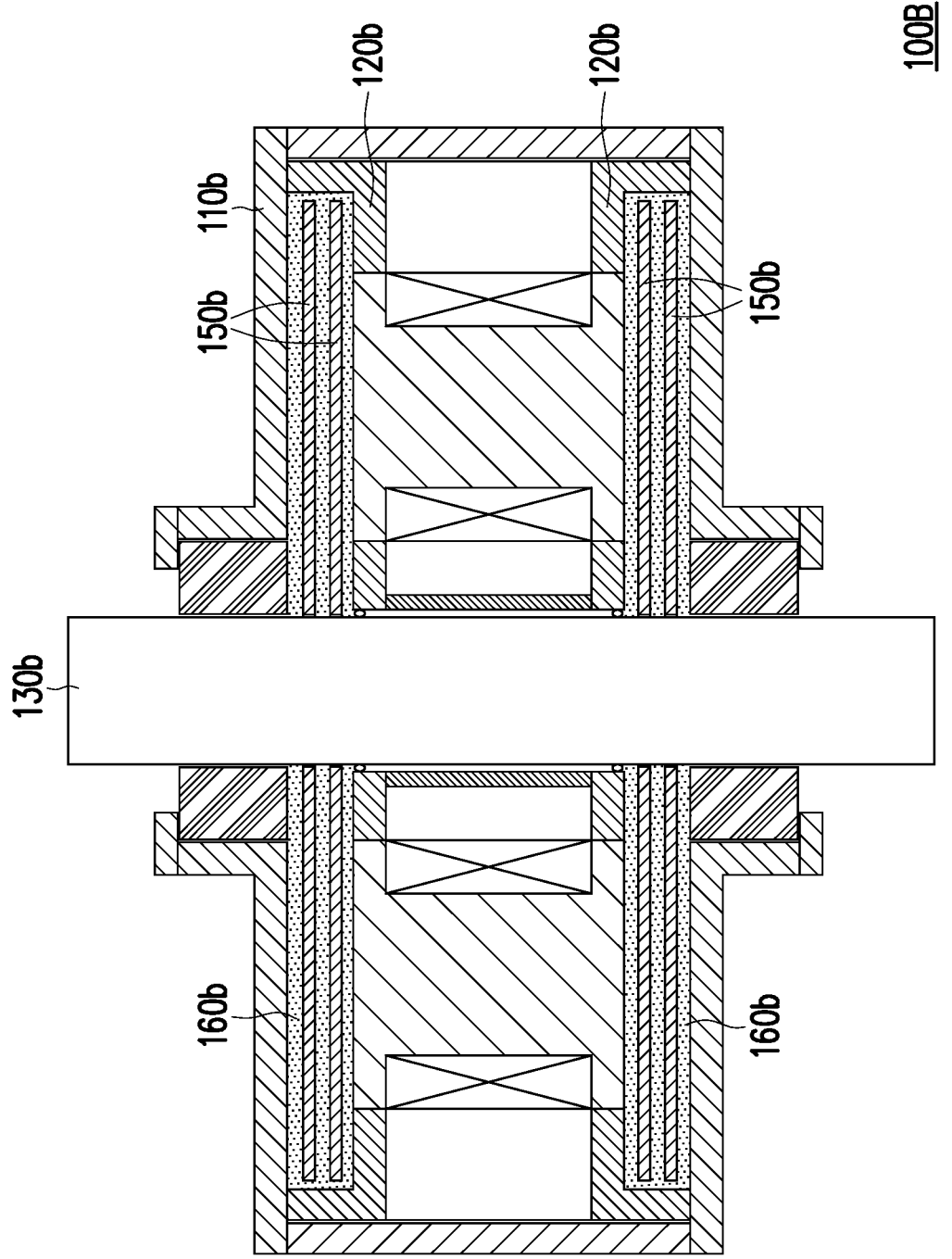
FIG. 4 is a cross-sectional schematic view of a controllable rotary brake adopting a plurality of resistance discs according to another embodiment of the disclosure.

FIG. 4 is a cross-sectional schematic view of a controllable rotary brake adopting a plurality of resistance discs according to another embodiment of the disclosure.

With reference to FIG. 4, a controllable rotary brake 100B provided by this embodiment is similar to the controllable rotary brake 100 provided in FIG. 1D. A difference therebetween is that the controllable rotary brake 100B has a plurality resistance discs 150b (four are schematically shown in FIG. 4). The resistance discs 150b are sleeved on two ends of the shaft 130b and are located between two outer casings 110b and two non-magnetically permeable isolating rings 120b. That is, the resistance discs 150b are provided between the corresponding outer casing 110b and non-magnetically permeable isolating ring 120b, and the resistance discs 150b are all encapsulated by magneto-rheological fluid layers 160b. The effect of adopting plural resistance discs 150b is to increase a contact area between each of the resistance discs 150b and each of the magneto-rheological fluid layers 160b, so that resistance acted on a rotor (the shaft 130b and the resistance discs 150b) applied by the magneto-rheological fluid layers 160b may thus be increased.

For instance, when each of the magneto-rheological fluid layers 160b activates magnetic particles thereof and increases viscosity thereof as being affected by a magnetic field, the increased resistance of each of the magneto-rheological fluid layers 160b may at the same time be applied on the resistance discs 150b, so that rotation of the resistance discs 150b may be quickly slowed down.

FIG. 5A is a cross-sectional schematic view of a controllable rotary brake adopting two resistance discs according to another embodiment of the disclosure.

With reference to FIG. 5A, a controllable rotary brake 100C provided by this embodiment is different from the controllable rotary brake 100 provided in FIG. 1D. A difference therebetween is that the controllable rotary brake 100C has two ring-shaped members CE and two resistance discs 150c. The two ring-shaped members CE are disposed in two non-magnetically permeable isolating rings 120c, and each of the two ring-shaped members CE is tightly fitted to a notch SG of each of the resistance discs 150c. A shaft 130c is adapted to drive the two resistance discs 150c to pivot relative to the two ring-shaped members CE. Besides, a flowing space FS is formed among each of the ring-shaped members CE, each of the resistance discs 150c, and each of the non-magnetically permeable isolating rings 120c and is configured to accommodate a magneto-rheological fluid layer 160c. In this embodiment, combination of the ring-shaped members CE and the resistance discs 150c may seal openings of the non-magnetically permeable isolating rings 120c and may thus be configured to replace outer casings.

Figure 5B:
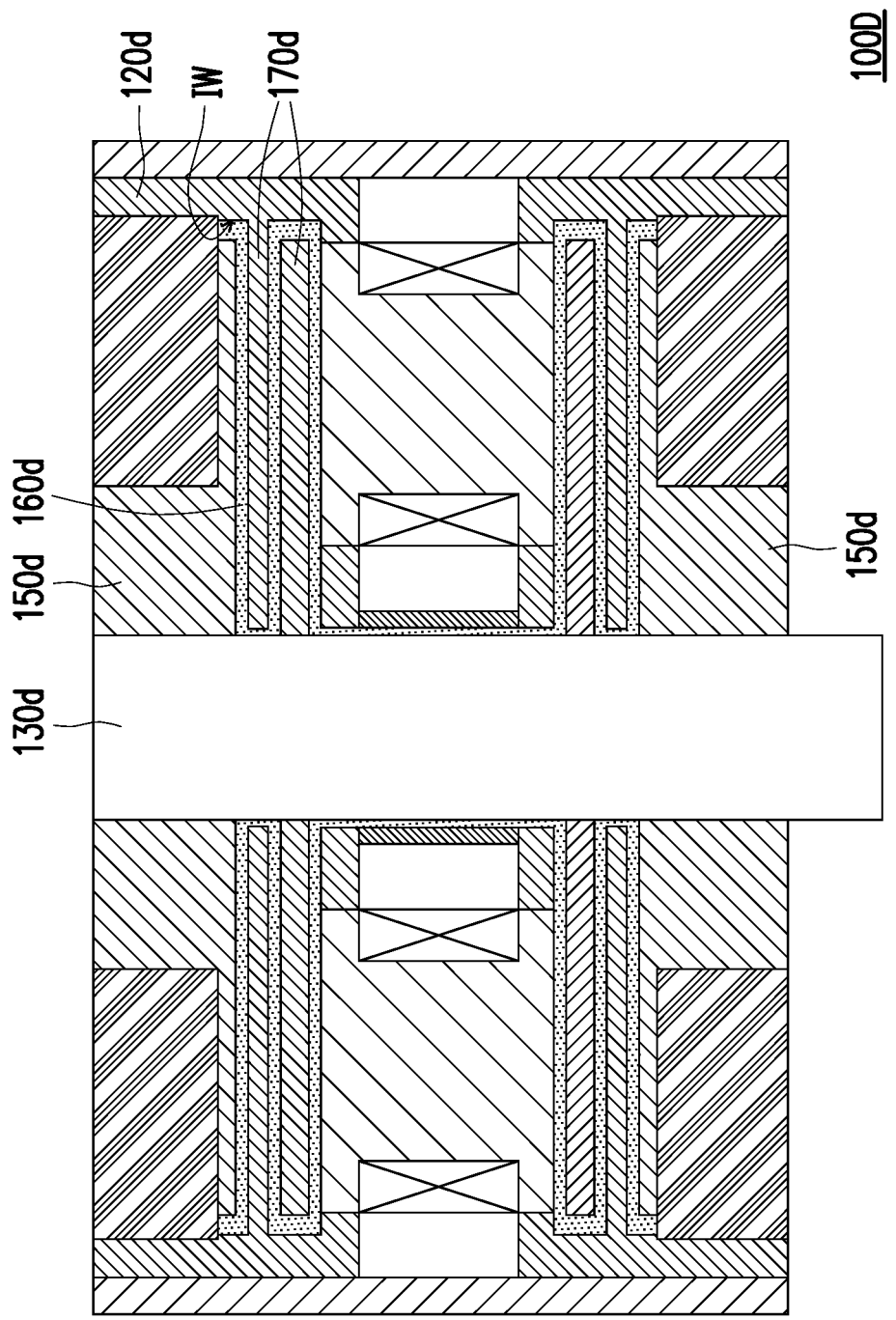
FIG. 5B is a cross-sectional schematic view of a controllable rotary brake adopting a plurality of auxiliary discs according to another embodiment of the disclosure.

FIG. 5B is a cross-sectional schematic view of a controllable rotary brake adopting a plurality of auxiliary discs according to another embodiment of the disclosure.

With reference to FIG. 5B, a controllable rotary brake 100D provided by this embodiment is similar to the controllable rotary brake 100C provided in FIG. 5A. A difference therebetween is that each of two magneto-rheological fluid layers 160d fills between a corresponding non-magnetically permeable isolating ring 120d and a corresponding resistance disc 150d, and a plurality of auxiliary discs 170d are also included and are located in the two magneto-rheological fluid layers 160d. To be specific, two of the auxiliary discs 170d are sleeved on a shaft 130d, and another two auxiliary discs 170d are disposed on inner walls IW of the two non-magnetically permeable isolating rings 120d. Since each resistance disc 150d and the auxiliary discs 170d are both encapsulated by the magneto-rheological fluid layers 160d, resistance acted on a rotor (the shaft 130d, the resistance discs 150d, and the auxiliary discs 170d) applied by the magneto-rheological fluid layers 160d may thus be increased.

In view of the foregoing, the controllable rotary brake provided by the disclosure has an even number of magnetic field generating portions, and opposite magnetic field propagation paths are provided between adjacent magnetic field generating portions. After passing through the at least one magneto-rheological fluid layer, the magnetic fields of the magnetic field generating portions may be propagated to other adjacent magnetic field generating portions along the outer casings or the at least one resistance disc. When being propagated along the magnetic field generating portions and the outer casings, the magnetic fields may act on different positions of the at least one magneto-rheological fluid layer, so that acting areas of the at least one magneto-rheological fluid layer may be expanded, and a controllable maximum value of torque may be increased. Therefore, compared to an existing unipolar magneto-rheological fluid brake, the controllable rotary brake provided by the disclosure provides a favorable torque to volume ratio and expanded application ranges.

Further, with the use of the resistance disc, the controllable rotary brake provided by the disclosure is flat and exhibits less volume. The magnetic field generating portions may generate magnetic fields that may propagate vertically and horizontally propagate along the outer casings, such that acting areas that may be activated by the magneto-rheological fluid layers are accordingly increased, and generated torque may thus be increased. The disclosure therefore provides features of small volume and high torque.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A controllable rotary brake, comprising:
   two non-magnetically permeable isolating rings, spaced apart from each other in an axial direction, wherein each of the non-magnetically permeable isolating rings has a bottom wall, and an even number of penetrating holes are formed on the bottom wall;
   two outer casings, disposed in two flowing spaces formed by the two non-magnetically permeable isolating rings, wherein the outer casings are made of a magnetic material:
   a shaft, rotatably inserted in the two non-magnetically permeable isolating rings, adapted to pivot relative to the two non-magnetically permeable isolating rings;
   an even number of magnetic field generating portions, two ends of each of the magnetic field generating portions are tightly fitted to the corresponding penetrating holes of the two non-magnetically permeable isolating rings;
   at least one resistance disc, sleeved on the shaft, spaced apart from one of the non-magnetically permeable isolating rings; and
   at least one magneto-rheological fluid layer, filling between the at least one resistance disc and one of the non-magnetically permeable isolating rings, wherein the at least one magneto-rheological fluid layer contacts the at least one resistance disc and one end of each of the magnetic field generating portions.

2. The controllable rotary brake according to claim 1, wherein each of the non-magnetically permeable isolating rings has a ring side wall protruding from and formed on an outer edge of the bottom wall, each of the ring side walls is propped against each of the outer casings to form each of the flowing spaces, and each of the ring side walls surrounds outside the at least one resistance disc.

3. The controllable rotary brake according to claim 1, wherein the at least one magneto-rheological fluid layer comprises two magneto-rheological fluid layers filling in the corresponding flowing spaces, and the at least one resistance disc comprises a plurality of resistance discs located in the two flowing spaces.

4. The controllable rotary brake according to claim 1, wherein a magnetic field propagation path of each of the magnetic field generating portions is opposite to two magnetic field propagation paths of adjacent two magnetic field generating portions.

5. The controllable rotary brake according to claim 1, wherein each of the magnetic field generating portions has a magnetically permeable pillar, a first magnetic pole, a second magnetic pole, and a magnetically permeable coil, the first magnetic pole and the second magnetic pole are disposed on two ends of the magnetically permeable pillar and are tightly fitted to the corresponding penetrating holes of the two non-magnetically permeable isolating rings, and the magnetically permeable coil surrounds around an outer ring surface of the magnetically permeable pillar and is located between the first magnetic pole and the second magnetic pole.

6. The controllable rotary brake according to claim 5, wherein a magnetic field propagation path of each of the magnetic field generating portions is transmitted from the first magnetic pole to one side of the outer casing in a vertical direction, transmitted to the two second magnetic poles of adjacent two magnetic field generating portions in a horizontal direction of the outer casing, transmitted to the other side of the outer casing along the corresponding magnetically permeable pillars and the two first magnetic poles, and then transmitted back to the second magnetic pole of each of the magnetic field generating portions in the horizontal direction of the outer casing.

7. The controllable rotary brake according to claim 5, wherein the first magnetic pole and the second magnetic pole protrudes outside the magnetically permeable pillar in a radial direction.

8. The controllable rotary brake according to claim 1, further comprising: a sleeving tube, wherein a through hole is formed in a center of each of the bottom walls of each of the non-magnetically permeable isolating rings, two ends of the sleeving tube are propped against the two non-magnetically permeable isolating rings and communicate with the two through holes, and the shaft is inserted in the sleeving tube and is adapted to pivot relative to the sleeving tube.

9. The controllable rotary brake according to claim 8, wherein a gap is provided between the sleeving tube and the shaft, and the at least one magneto-rheological fluid layer fills the gap.

10. The controllable rotary brake according to claim 1, further comprising: two ring-shaped members, tightly fitted to two opposite openings of the two outer casings, and the shaft is inserted in the two ring-shaped members and is adapted to pivot relative to the ring-shaped members.

11. The controllable rotary brake according to claim 1, further comprising: an outer ring member, sleeved on outer peripheries of the two non-magnetically permeable isolating rings.

12. A controllable rotary brake, comprising:
two non-magnetically permeable isolating rings, spaced apart from each other in an axial direction, wherein each of the non-magnetically permeable isolating rings has a bottom wall, and an even number of penetrating holes are formed on the bottom wall;
a shaft, rotatably inserted in the two non-magnetically permeable isolating rings, adapted to pivot relative to the two non-magnetically permeable isolating rings;
an even number of magnetic field generating portions, two ends of each of the magnetic field generating portions are tightly fitted to the corresponding penetrating holes of the two non-magnetically permeable isolating rings;
at least one resistance disc, sleeved on the shaft, spaced apart from one of the non-magnetically permeable isolating rings;
at least one magneto-rheological fluid layer, filling between the at least one resistance disc and one of the non-magnetically permeable isolating rings, wherein the at least one magneto-rheological fluid layer contacts the at least one resistance disc and one end of each of the magnetic field generating portions; and
two ring-shaped members, wherein a number of the at least one resistance disc is two, the two ring-shaped members are disposed in the two non-magnetically permeable isolating rings, each of the two ring-shaped members is tightly fitted to a notch of each of the resistance discs, and the shaft is adapted to drive the two resistance discs to pivot relative to the two ring-shaped members.

13. The controllable rotary brake according to claim 12, wherein a number of the at least one magneto-rheological fluid layer is two, and the magneto-rheological fluid layers fill between the corresponding non-magnetically permeable isolating rings and the resistance discs, and a plurality of auxiliary discs are located in the two magneto-rheological fluid layers.

* * * * *